(12) United States Patent
Mavinkurve et al.

(10) Patent No.: US 7,779,370 B2
(45) Date of Patent: Aug. 17, 2010

(54) USER INTERFACE FOR MOBILE DEVICES

(75) Inventors: Sanjay Mavinkurve, East Palo Alto, CA (US); Shumeet Baluja, Santa Clara, CA (US); Maryam Kamvar, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1022 days.

(21) Appl. No.: 11/478,835

(22) Filed: Jun. 30, 2006

(65) Prior Publication Data

US 2008/0005668 A1   Jan. 3, 2008

(51) Int. Cl.
G06F 3/14 (2006.01)
G06F 3/048 (2006.01)

(52) U.S. Cl. .................... 715/864; 715/767; 715/784; 715/785

(58) Field of Classification Search .............. 715/864, 715/767, 784, 785
See application file for complete search history.

(56) References Cited

U.S. PATENT DOCUMENTS

| | | | |
|---|---|---|---|
| 6,353,448 B1 * | 3/2002 | Scarborough et al. | 715/744 |
| 6,727,917 B1 | 4/2004 | Chew et al. | |
| 7,003,327 B1 | 2/2006 | Payne et al. | |
| 7,007,242 B2 | 2/2006 | Suomela et al. | |
| 7,032,181 B1 | 4/2006 | Farcasiu | |
| 7,047,502 B2 * | 5/2006 | Petropoulos et al. | 715/781 |
| 7,082,578 B1 | 7/2006 | Fishkin et al. | |
| 7,103,388 B2 | 9/2006 | Scott | |
| 7,111,788 B2 | 9/2006 | Reponen | |
| 7,669,142 B2 * | 2/2010 | Ray et al. | 715/825 |
| 2003/0144996 A1 * | 7/2003 | Moore, Jr. | 707/3 |
| 2003/0156146 A1 | 8/2003 | Suomela et al. | |
| 2004/0027326 A1 | 2/2004 | Hays et al. | |
| 2005/0130631 A1 | 6/2005 | Maguire et al. | |
| 2005/0153745 A1 | 7/2005 | Smethers | |
| 2005/0162523 A1 * | 7/2005 | Darrell et al. | 348/211.2 |

(Continued)

FOREIGN PATENT DOCUMENTS

EP   1 465 394   10/2004

(Continued)

OTHER PUBLICATIONS

Milic-Frayling et al. "SmartView and SearchMobil: Providing Overview and Detail in Handheld Browsing", Lecture Notes in Computer Science, Springer Berlin/Heidelberg, vol. 2954, Published: 2004, pp. 17-19.*

(Continued)

*Primary Examiner*—Adam L Basehoar
*Assistant Examiner*—Yasin Patterson
(74) *Attorney, Agent, or Firm*—Fish & Richardson P.C.

(57) ABSTRACT

A computer-implemented method of displaying information on a mobile device is discussed. The method includes displaying on the mobile device a first view having a first search result element in an expanded format and a plurality of additional search result elements in a collapsed format, receiving a user input that identifies a selected search result element from the plurality of additional search result elements, and in response to the user input, displaying on the mobile device a second view having one of the plurality of additional search result elements in an expanded format, and the remainder of the plurality of additional search result elements in a collapsed format.

17 Claims, 11 Drawing Sheets

U.S. PATENT DOCUMENTS

| | | | |
|---|---|---|---|
| 2005/0177801 A1* | 8/2005 | Vronay et al. | 715/828 |
| 2005/0229118 A1* | 10/2005 | Chiu et al. | 715/864 |
| 2005/0283806 A1 | 12/2005 | Torvinen | |
| 2006/0031769 A1 | 2/2006 | Eizips | |
| 2006/0064638 A1 | 3/2006 | Bocking | |
| 2006/0079238 A1 | 4/2006 | Liu et al. | |
| 2006/0080292 A1* | 4/2006 | Alanzi | 707/3 |
| 2006/0143568 A1* | 6/2006 | Milener et al. | 715/738 |
| 2006/0190441 A1* | 8/2006 | Gross et al. | 707/3 |
| 2006/0195252 A1 | 8/2006 | Orr et al. | |
| 2006/0248062 A1* | 11/2006 | Libes et al. | 707/3 |
| 2006/0277167 A1* | 12/2006 | Gross et al. | 707/3 |
| 2006/0294476 A1* | 12/2006 | Buckley | 715/781 |
| 2007/0067272 A1* | 3/2007 | Flynt et al. | 707/3 |
| 2007/0074125 A1* | 3/2007 | Platt et al. | 715/760 |

FOREIGN PATENT DOCUMENTS

| | | |
|---|---|---|
| WO | WO98/48555 | 10/1998 |
| WO | WO2005/053279 | 6/2005 |

OTHER PUBLICATIONS

Karlson, A. K., Robertson, G. G., Robbins, D. C., Czerwinski, M. P., and Smith, G. R. 2006. FaThumb: a facet-based interface for mobile search. In Proceedings of the SIGCHI Conference on Human Factors in Computing Systems (Montréal, Québec, Canada, Apr. 22-27, 2006). R. Grinter, T. Rodden, P. Aoki, E. Cutrell, R. Jeffries, and G. Olson, Eds. CHI.*

Church, K., Smyth, B., and Keane, M. T. 2006. Evaluating interfaces for intelligent mobile search. In Proceedings of the 2006 international Cross-Disciplinary Workshop on Web Accessibility (W4a): Building the Mobile Web: Rediscovering Accessibility? (Edinburgh, U.K., May 22-22, 2006). W4A '06, vol. 134. ACM, New York, NY, 69-78. DOI= http://doi.a.*

Harada, S., Naaman, M., Song, Y. J., Wang, Q., and Paepcke, A. 2004. Lost in memories: interacting with photo collections on PDAs. In Proceedings of the 4th ACM/IEEE-CS Joint Conference on Digital Libraries (Tuscon, AZ, USA, Jun. 7-11, 2004). JCDL '04. ACM, New York, NY, 325-333. DOI= http://doi.acm.org/10.1145/996350.996425.*

Sweeney et al., "Effective search results summary size and device screen size: Is there a relationship?", *Information Process & Management*, Pergamon Press, Oxford, GB, vol. 42, No. 4, Aug. 24, 2005, pp. 1056-1074, XP005223996 ISSN: 0306-4573.

\* cited by examiner

USER INTERFACE FOR MOBILE DEVICES

TECHNICAL FIELD

The disclosure relates to user interfaces for mobile devices, and more particularly to user interfaces for devices with size-limited displays.

BACKGROUND

As the quantity of available information on computer networks has increased, and as users have become accustomed to accessing this information through fixed computing devices (such as a desktop personal computer permanently connected to an appropriately provisioned network) and laptop computing devices (having either a wired or wireless connection to a network), users have demanded access to the same information through their mobile devices. Specifically, users now expect to be able to access stock quotes, baseball scores, restaurant listings and the like, including accurate network search results, from their mobile devices. In addition to expecting access to such information, users also desire intuitive, attractive, convenient and useful presentation of the information on their mobile devices, having become accustomed to such presentation from their desktop and laptop computing devices.

Desktop and laptop computer display monitors or screens tend to be large, and generally provide ample display-screen "real estate" for elaborate and extensive information presentation. Because users may typically desire attractive and comprehensive information presentation, conventional user interfaces for desktop and laptop computers have been designed to exploit the abundant presentation area generally available on desktop computer display monitors or laptop computer display screens. For example, a desktop or laptop computer user may launch a browser (e.g., Microsoft Internet Explorer or Netscape Navigator) and tender a search query to a network search engine, such as Google. The search engine may execute a network search using the tendered query, and the user may then be presented with search results that include textual descriptions, images, titles, Uniform Resource Locators (URLs), size metrics, embedded machine-executable code, or some combination thereof. Moreover, a large number of search results and related information may be concurrently displayed on the desktop monitor or laptop display, providing the user with a wealth of content and a plethora of options. Additionally, a wide variety of input devices exist for entering or acquiring data with desktop or laptop machines, or for making selections with applications running on conventional desktop or laptop computing devices. Examples include keyboards, mice, microphones, scanners, cameras (still or video), touch-pads, joysticks, trackballs, pointing devices (such as IBM's TrackPoint device), etc.

Presenting information to users of mobile devices, such as cellular telephones, personal digital assistants (PDAs), etc., is much more difficult, however, because such devices are typically equipped with considerably smaller display screens, and may have fewer options for inputting data. Additionally, mobile device display screens may have limited resolution capabilities compared to desktop monitors or laptop computer displays. While the smaller screen sizes commonly found on mobile devices facilitate device portability and reduced weight, they make effective content presentation and user interface interaction with users complicated and challenging by limiting the amount of content that can be presented to a user within a particular view. Users may become frustrated with inadequate or inferior content presentation on their mobile devices, which may in turn reflect poorly upon the mobile device provider or content providers.

SUMMARY

A method and system are disclosed to provide a user interface for a mobile device. In general, search results may be displayed on a constrained display in a manner that maximizes the display space of a mobile device. For example, certain search results can be displayed in an expanded form, while others are displayed in a contracted form so as to permit a larger number of search results to be displayed at one time. Other features also improve user interaction with a mobile device having a constrained display, or interaction with other types of devices.

In one implementation, a computer-implemented method of displaying information on a mobile device is disclosed. The method comprises displaying on the mobile device a first view having a first search result element in an expanded format and a plurality of additional search result elements in a collapsed format, receiving a user input that identifies a selected search result element from the plurality of additional search result elements, and in response to the user input, displaying on the mobile device a second view having one of the plurality of additional search result elements in an expanded format, and the remainder of the plurality of additional search result elements in a collapsed format. The method may further comprise, in response to the user input, displaying on the mobile device in the second view the first search result element in a collapsed format. The expanded format may comprise a title, a textual description, and an address designator, or may comprise an image, a label, and an address designator. Also, the collapsed format may comprise a title, or an image.

In some aspects, the search result elements may comprise images, and the images may be displayed in a closely-spaced grid comprising one or more rows and one or more columns of the images. The search result elements may also be displayed according to a relevancy metric. In addition, the method may further comprise a search box for entering a search engine query term, and an accelerator key associated with a search result element, wherein selection of the accelerator key selects the search result element. The method may also comprise an accelerator key indicator displayed in the first view and indicative of the accelerator key, and may include the step of displaying a selectable icon that, when selected, causes one or more additional search result elements to be displayed on the mobile device.

In yet other aspects, the method may further comprise receiving a user input to select a search result element and displaying an electronic document on the mobile device in response to the user input. The method may also comprise receiving a user input to select a search result element and placing a phone call from the mobile device in response to the user input. The first view may be displayed pre-scrolled to a relevant portion of a content page.

In another implementation, a computer-readable medium having instructions stored thereon is disclosed. When executed, the instructions perform a method of displaying information on a display of a mobile device. The method comprises displaying on the mobile device a first view having a first search result element in an expanded format and a plurality of additional search result elements in a collapsed format, receiving a user input that identifies a selected search result element from the plurality of additional search result elements, and in response to the user input, displaying on the mobile device a second view having one of the plurality of additional search result elements in an expanded format, and the remainder of the plurality of additional search result elements in a collapsed format.

In yet another implementation, a system for displaying information on a display of a mobile device is disclosed. The system comprises means for displaying on the mobile device a first view having a first search result element in an expanded format and a plurality of additional search result elements in a collapsed format, means for receiving a user input that identifies a selected search result element from the plurality of additional search result elements, and means for displaying on the mobile device, in response to the user input, a second view having one of the plurality of additional search result elements in an expanded format, and the remainder of the plurality of additional search result elements in a collapsed format.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

The systems and techniques described here relate to user interface features and information presentation for electronic devices having size-limited displays. The systems can take many forms, including wireless mobile telephones, personal digital assistants (PDAs), personal communicators, and the like. Data may be entered into the devices in a variety of forms, including by telephone keypad, stylus, or audio (e.g., voice) input. In general, the systems operate by presenting information or content to a user of the device, receiving user input or selections, and presenting additional information or content to the user. Presentation of information or content may be based on a user's request or requests, on other information such as recent activity by other users of the systems, or on a combination of requests and other information.

Advantageously, the systems and techniques may allow a mobile device user to enter a network search query and be conveniently presented with informative search results for the query following search engine execution. The user may review this information, may request more detail on a particular informational element, may request to see additional results, may request to view the results in an alternative format, or request a new search. In this manner, the mobile device user's experience may be enhanced as relevant, useful, and visually appealing result information may be presented, and convenient and intuitive follow-up options may be offered.

Figure 1:
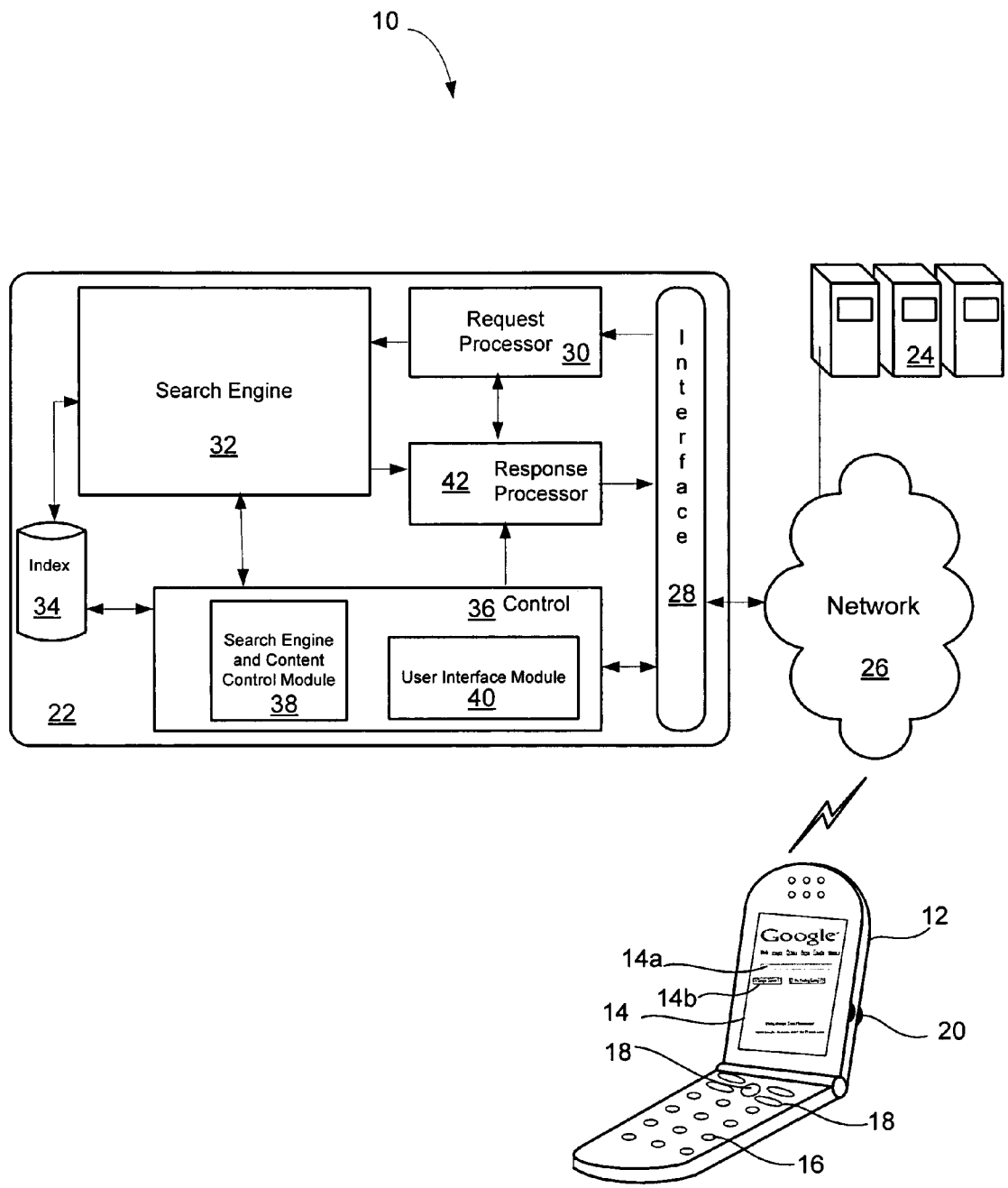
FIG. 1 is a block diagram of a system that may be used to provide a user interface for a mobile device, according to one implementation.

FIG. 1 is a block diagram of a system 10 that may be used to provide a user interface for a mobile device, according to one implementation. In this implementation, the system 10 includes a device 12, shown as a cellular telephone for communicating with a user, but which could take any appropriate form, such as a PDA, a personal computer, a personal communication device, etc. In this implementation, the device 12 has a display screen 14 that can be programmed to display any appropriate information to a user of the device 12. For example, the display screen 14 could display information related to an Internet searching application, such as a search box 14a and related control buttons. As shown, search box 14a may be a contrasting area on the screen 14 that displays a search term as it is entered by the user. Search button 14b may submit the contents of box 14a to a search engine, such as a search engine connected to the cellular network by the Internet. The display screen 14 may then display results of the search, as will be described in detail below.

Data may be entered into device 12 in any of a number of manners. Specifically, data entry keys 16 may be used to enter information such as alphanumeric characters, and may take the form of a standard telephone keypad, with alphabetic characters on the 2 through 9 keys. Other appropriate ways of entering alphanumeric information, including voice recognition, may also be used. As used here, references to entry of text encompass entry through a keyboard or by writing, and also other manners of data entry, such as by speaking to a voice-recognition enabled system. Control keys 18 may be provided, for example, to perform predetermined functions or programmed functions, or to control icons, images, or text on the display screen 14. The control keys 18 may also be used as supplemental keys; i.e., the number "0" could represent something other than "0," the "#" key may be used as a space key, the "*" key may be a proxy for the backspace key, and the "1" key may represent punctuation. Any of the keys 16, 18 may also be used as directional keys for on-screen navigation. Also, control wheel 20 may be provided to allow a user to scroll through selections shown on the display screen 14, and to push inward to click on and select a desired selection. Other appropriate data presentation and data entry features may also be provided, particularly where the device 12 operates via voice control.

The system 10 also includes a data processing system 22, servers 24, and a network 26. The mobile device 12, the data processing system 22, and the servers 24 are each coupled to the network 26. The mobile device 12 communicates wirelessly with the network 26, such as over a cellular telephone network. The network 26 may be a single network such as a local area network (LAN) or a wide area network (WAN) like the Internet, or may alternatively be a combination of networks. The servers 24 may include content servers that store collections of documents (e.g., web pages), advertisement servers that store advertisements for various products or services (for example, text-only ads, image ads, graphical ads, audio or video ads, etc.), or e-mail servers that provide email functionality to user devices 12. The documents or ads may further include embedded information such as machine-executable code or links to other documents. The servers 24 may store electronic content in electronic documents written in xHTML (Extensible Hypertext Markup Language), HTML (Hypertext Markup Language), WML (Wireless Markup Language), CHTML (compact HTML), or in any other appropriate format.

The data processing system 22 may take any applicable form, and may be, for example, a system such as that provided by Google. The data processing system 22 may receive information requests from the mobile device 12, may locate suitable information corresponding to the request, may format the information for presentation on the display 14 of the device 12, and may convey the formatted information to the device 12. The data processing system 22 includes an interface 28 to permit communications in a variety of ways. For example, the data processing system 22 may communicate with the servers 24 over the network 26 to access and process electronic content that is stored on the servers 24. The data processing system 22 may also communicate with the mobile device 12 via the network 26, or via the network 26 and the cellular phone network, for example, or via some other combination of networks. A request processor 30 may receive and may process, as by parsing or formatting, for example, a request from the mobile device 12, such as a network search request. The network search request may include one or more search query terms entered by a user in search box 14a.

A search engine 32 may then receive the search request from the request processor 30, and may search a searchable index 34 for electronic content appropriate for, or corresponding to, the search request. The index 34 may include an index database and a cached information database. The index database may contain data representing searchable information available to the data processing system 22.

As an illustrative example, the data processing system 22 may scan the Internet or various intranets for content such as web sites, workgroup discussions, etc. The system 22 may extract key words, phrases, or other objects from the content, and may organize the information in the index database in a manner that allows ready searching. Statistical or other information such as indicators of how certain web sites link to other web sites to facilitate a system such as the Google Page Rank system may also be generated.

The cached database may contain copies or partial copies of content that the data processing system 22 has identified. In one implementation, the cached database may contain web pages or portions of web pages (e.g., only textual content or only non-video content). The cached database may permit a user accessing the system 22 to request locally-stored copies of the content rather than remote copies, which may otherwise require making direct contact with the content provider. As such, the user may be able to reduce latencies and access the content faster, and may have access to content that the provider has since altered or removed, or to content that has otherwise become unavailable from the content provider. Additional information including various applications, system parameters, information about registered users of the system 22, etc., may be stored in storage (not shown in FIG. 1) within the data processing system 22.

A control component 36 manages the operation of the data processing system 22, and includes a search engine and content control module 38 and a user interface module 40. The search engine and content control module 38 may include a crawler that automatically traverses the network 26 and requests electronic documents from the servers 24. Such content, or portions thereof (e.g., keywords), may then be stored in the index database or cached database, and may later be searched or retrieved. The content may be classified according to the electronic format the content is provided in, or by whether the content is of a type that may be presented on a mobile device (for example, whether on a particular device or on mobile devices in general). The search engine and content control module 38 may use predetermined or modifiable conditions to determine whether the content is to be stored in the index 34, and whether information currently stored in the index 34 should be purged.

The user interface module 40, as will be further described below, prepares electronic content for presentation on the display 14 of the mobile device 12, and receives user input. In one implementation, the user interface module 40 may prepare search result elements for presentation to a user in response to a user's tendered search query request.

The user interface module 40 may determine an appropriate format, layout, arrangement, selection, quantity, type, and grouping of search result elements for presentation via display 14 of the mobile device 12. The user interface module 40 may also determine whether to include additional information relating to the search result elements in the content presented to the user. The user interface module 40 may consider user input data or selections from the mobile device 12, mobile device requirements or limitations, activity corresponding to other device users, predetermined or modifiable settings or conditions, or any other appropriate consideration when administering and controlling the user interface of the mobile device 12. Alternatively, the user interface module 40 could reside on the mobile device 12, rather than within the data processing system 22.

A response processor 42 may format a response to a request in a manner that allows it to be used by the requesting device, such as device 12. For example, the response processor 42 may format or convert information to a Wireless Application Protocol (WAP) format, HTML document, XML document, VoiceML result, dHTML, xHTML, Java, Javascript, or any other format that the requesting device may be capable of interpreting, and may then convey the result to interface 28, to be transmitted to device 12 over network 26. Internal communications within the data processing system 22 may occur over a high speed, high bandwidth network or networks such as SONET, Infiniband, Ethernet, or any other appropriate protocol to permit the system 22 to respond to a large number of distinct requests simultaneously, or near simultaneously. To allow for scalability, the data processing system 22 or any of its components 28, 30, 32, 34, 36, 38, 40, 42 may be split into two or more separate systems or components, and may be connected to the network 26 or to one another in any of a variety of ways, as is known in the art.

Figure 2:
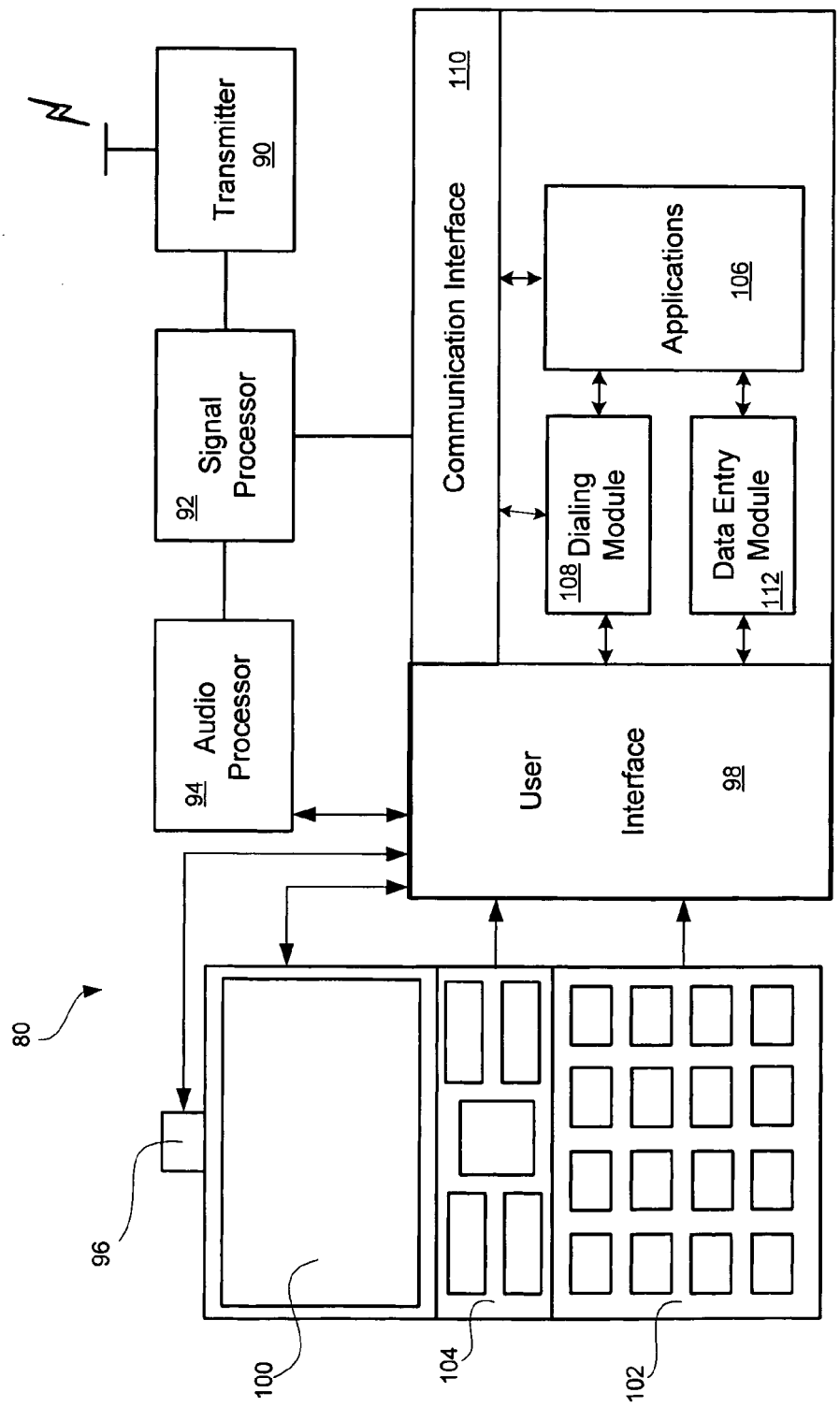
FIG. 2 is a schematic diagram of a wireless communication handset for generating requests and receiving and using information generated in response to those requests.

FIG. 2 is a schematic diagram of a wireless communication handset for generating requests and receiving and using information generated in response to those requests. A communication system 80 may be implemented in a device such as a personal communicator, e.g., a cellular telephone. The system 80 receives and transmits information wirelessly using a transmitter 90, with the received signals being passed to a signal processor 92, which may comprise digital signal processor (DSP) circuitry and the like. Normal voice communication is routed to or from an audio processor 94, which may communicate with a speaker/microphone 96, including via a user interface 98.

User interface 98 handles all communication with the user of the system 80, including voice, visual, and data entry communication. Visual presentation of information may be provided via a display screen 100. General data entry, apart from entered voice data, may occur through a keypad 102, which may be arranged as a standard 12-key telephone keypad. The device may also be provided with appropriate control keys 104 for performing necessary control functions. Keypad 102 and control keys 104 may include contact pushbuttons, joysticks, portions of touch-sensitive panels, or other appropriate input devices. Although the communication is shown for clarity as occurring through a single user interface 98, multiple interfaces may be used, and may be combined with other components as necessary.

The system 80 may be provided with a number of computer applications 106, such as games, applications to assist in dialing numbers, and applications to permit web browsing, including the entry of data as part of the web browsing. The applications 106 may be stored in ROM, Flash memory, RAM, MRAM, EPROM, EEPROM, or otherwise, as appropriate, and may be accessed by the system 80 as needed. A dialing module 108 may provide standard dialing functionality for the system, receiving entered dialing digits or voice dialing instructions through interface 98, and providing appropriate dialing signals through transmitter 90 using communication interface 110. A data entry module 112 receives data other than dialing instructions, such as search data entered into the system 80. The data entry module 112 may provide the entered data to an application 106, for example.

In one embodiment, the user interface 98 functions at a low level of abstraction to control or respond to the I/O devices of the system 80 as directed by the user interface module 40 of the data processing system 22 (see FIG. 1). Examples include input receipt and display presentation. The user interface 98 may receive user input, such as an input signal resulting from a user pressing keypad 102 or keys 104, and may convert the input in a manner known to those skilled in the art to an appropriate signal that may be interpreted by the user interface module 40 (see FIG. 1). The user interface 98 may also receive signals from the user interface module 40 that specify a particular view to be rendered on the screen 100, and may generate appropriate signals to effectuate the desired display view in a manner known to those skilled in the art.

In another embodiment, the user interface 98 may assume a larger role and work in concert with the user interface module 40, sharing user interface administration and control duties with the user interface module 40. In yet another embodiment, the user interface module 40 may be merged with the user interface 98 on the handset. While the discussion that follows will, for clarity, primarily refer to the user interface module 40 of the data processing system 22 (see FIG. 1), it is to be understood that, in general, the components allow for all or part of the process of providing a user interface to be taken up by the system 80 itself, rather than by a central system.

Although shown in an implementation in a personal communicator, system 80 may take many other forms. For example, system 80 could be implemented as part of a personal computer, whether networked or un-networked, and if networked, whether by wire or wirelessly. Also, data entry may occur in different manners, including by complete keyboard, constrained keyboard, or voice command. Also, one or more components may be located remotely from the system 80, such as at a remote server, and the functionality of system 80 may be provided by combining the components or using components other than those shown.

FIGS. 3-12 are exemplary screen shots showing an operation of a user interface for mobile devices. The screen shots shown in FIGS. 3-12 may be created, selected, arranged, and administered by the user interface module 40 (see FIG. 1) and may be presented, for example, on display screen 14 of the device 12 shown in FIG. 1, or on the screen 100 of the handset shown in FIG. 2. Alternatively, the user interface 98 of FIG. 2 may create, select, arrange, and administer the screen shots, or may collaborate with the user interface module 40 in a sharing of tasks to render the screen shots.

Figure 3:
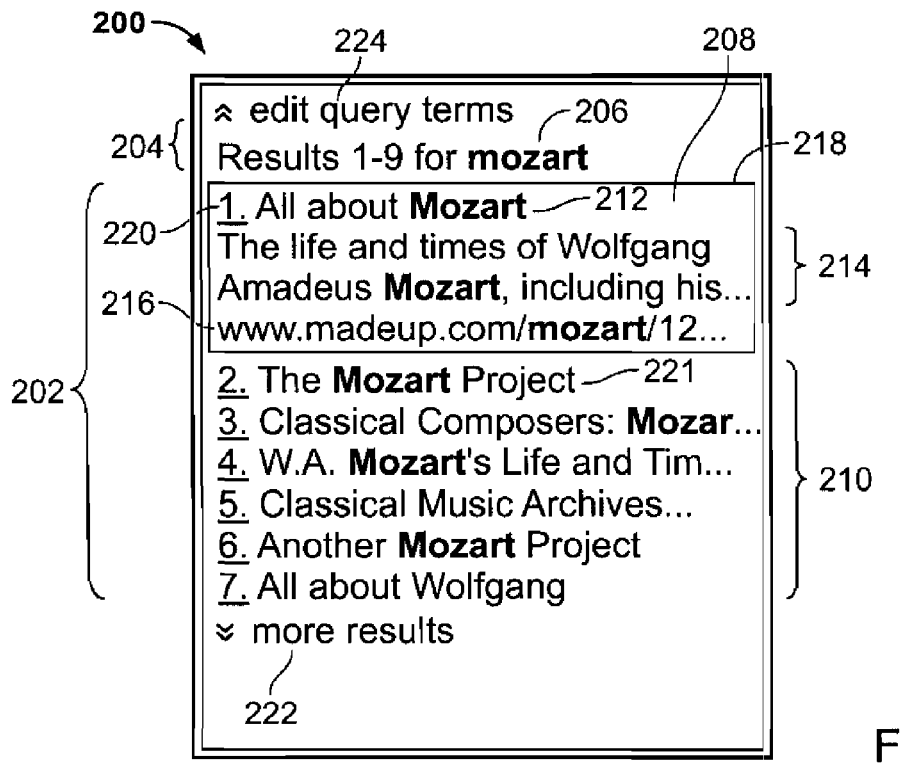
FIGS. 3-12 are exemplary screen shots showing an operation of a user interface for mobile devices.

Referring first to FIG. 3, a view 200 includes a collection 202 of search result elements. Each search result element in the collection 202 may correspond to an electronic document (e.g., a web page), an advertisement (perhaps identified using Google's Adwords system for query keyword advertising identification, or Google's AdSense, a content-relevant advertising system), or any other appropriate electronic content. In this illustrative example, a user has previously requested a network search by tendering a search query to a network search engine, such as the search engine 32 shown in the data processing system 22 of FIG. 1. The user has requested search results relating to an entered search term "mozart," perhaps in an effort to discover information pertaining to the famous composer Wolfgang Amadeus Mozart. View 200 reflects this by presenting a view description 204: "Results 1-9 for mozart." In this example, a reproduced search term 206 ("mozart") is featured in bold typeface, which may provide a convenient reminder of the previously entered search term.

The collection 202 of search result elements includes a featured search result element 208 and a group 210 of non-featured search result elements. The featured search result element 208 includes a title 212 that serves as a label for the search result element 208. In this example, the title 212 of the featured search result element 208 is "All about Mozart." The word "Mozart" in the title 212 is presented in bold typeface to indicate that it matches the search term that was originally entered by the user when specifying network search parameters. In this example, prior to the user interface module 40 (see FIG. 1) rendering view 200, the search engine 32 may have searched the index 34 for instances of "mozart," identified appropriate index entries, and provided the user interface module 40 with the relevant information pertaining to the identified entries.

Searching the index 34 may employ matching algorithms to search on the identified search term, as is known in the art, and may further include identifying terms related to the search term or terms likely to be selected by the user in the future, and similarly searching the index 34 on those terms. For example, unlike the original search term 206, the word "Mozart" in the title 212 is capitalized and a match is nevertheless identified, which may indicate that the search engine 32 expanded the search beyond the originally submitted search request term ("mozart").

The featured search result element 208 also includes a description 214 of the search result element 208, which may supplement the title 212 by providing additional detail concerning the substance of the search result element 208. The user may reference the title 212 and the description 214 to make a determination as to whether she is interested in viewing the content (e.g., the web page) associated with the search result element 208. The description 214 may in certain instances be referred to as a "snippet," as it represents a portion of the web page or other content (e.g., stored files, e-mails, telephone numbers, etc.) found to be relevant. An address designator 216 specifies the location of the associated content. In this example, the address designator 216 is a URL, and may identify a server that houses the content identified by the search result element. Because of limited display screen area, the description 214 and the address designator 216 in this example include ellipses to inform the user that she is viewing only a portion of the corresponding description and address designator.

In this manner, display screen area may be conserved so that a larger number of non-featured search result elements 210 may be presented, along with the featured search result element 208 and its expanded format content. Thus, despite using a device having a size-limited display, the user may be presented with a large number of search result elements, including expanded information on one or more elements, which may permit the user to make a more informed choice concerning whether to proceed with the featured search result element 208. In other examples, a complete description (or longer description, occupying more than two lines on the view) or address designator may be displayed. As can be seen, instances of the search term "mozart" (or variations such as "Mozart") within the description 214 and address designator 216 are similarly presented in bold typeface, in reference to matches with the original search term submitted by the user.

In this illustrative example, the featured search result element 208 is enclosed in a box 218 that highlights the featured search result 208. The box 218 may indicate that the featured search result 208 is presently the focus of the view 200. Allowing the user to focus on a particular element, component, icon, portion of text, etc., within the view 200 may permit the user to initiate an action with respect to the focused element, component, icon, text, etc. For example, the user may press an appropriate key, such as an "Okay" or "Select" device key or a special function key to select the featured search result element 208. In response, the user interface module 40 may initiate an action, such as presentation of a web page identified by the search result element, placing a telephone call to a business or person associated with the search result element (e.g., by pressing on a click-to-call link), producing a coupon entitling the user to a reduced price on merchandise or services from a business identified by the search result element, or some other suitable action.

In this example, if the user selects the featured search result element 208, the user interface module 40 may render an electronic document (such as a landing page) corresponding to the title 212, description 214 and address designator 216 associated with the featured search result element 208. This web page (or other content in other examples) may be retrieved from the index 34, if applicable, or may be fetched from servers 24 (see FIG. 1). Alternatively, the content may have been preemptively loaded into memory on the mobile device, and may be retrieved locally for presentation.

As previously mentioned, the view 200 includes a group 210 of non-featured search result elements. Like the featured search result element 208, each of the non-featured search result elements includes a title, description, and address designator, but only the corresponding titles are displayed in view 200. As such, while the featured search result element 208 is presented in an expanded format (with title, description, and address designator, or portions thereof, displayed), each of the non-featured search result elements in the group 210 of non-featured search result elements are presented in a collapsed format (with only titles, or portions thereof, displayed). In this manner, the user is presented with a large number of search result elements along with detailed information on a single search result element. This may allow for easy scanning of titles, and more titles per page view. Presentation of a search result element in expanded format may include presenting one or more descriptors corresponding to that search result element, while presentation of a search result element in collapsed format may include presenting fewer descriptors for the corresponding search result element than would be displayed were the element presented in expanded format.

In other embodiments, two or more search result elements may be presented in expanded format, or all elements might be presented in a collapsed format, which may permit even more elements to be concurrently presented. While this example provides three descriptors (title 212, description 214, and address designator 216) for the featured search result 208 in expanded format, the user interface module 40 may alternatively provide only two of the three descriptors in expanded mode (e.g., only title 212 and description 214, only description 214 and address designator 216, or only title 212 and address designator 216), or may provide more than three descriptors (e.g., additionally an image, a content size descriptor, executable code, etc.) of the search result. Similarly, search result elements presented in collapsed format may include more than one descriptor. Any appropriate combination of expanded and collapsed search result elements is possible. For example, a view may show two search result elements in expanded format, and one or more (e.g., two, three, four, five, etc.) search result elements in collapsed format.

Each of the search result elements in view 200 is associated with an accelerator key. Accelerator keys may permit selection of an element via a single user action. In this example, the accelerator keys are denoted in view 200 by underlined numbers, which may be associated with the corresponding buttons on a standard telephone keypad. The featured search result element 208 is associated with the "1" button on a mobile device, as indicated by the underlined "1" icon 220 to the left of the title 212. Thus, the "1" button may be an accelerator key corresponding to the featured search result element 208, and the user may select the featured search result element 208 by pressing the "1" button on the mobile phone. In response, the user interface module 40 may cause an action to be performed. This action may be the same action as described above with reference to selecting the currently-focused element (here, also the featured search result element 208, as indicated by box 218), or it may be a distinct action.

Each of search result elements in the group 210 of non-featured search result elements is also associated with an accelerator key, and may similarly be selected by a single user action, despite not being presented in expanded format. For example, the user may press the "2" button to select the first 221 of the non-featured search result elements, titled "The Mozart Project" and having an underlined "2" icon to the left of the title, and the user interface module 40 may initiate an action. In like fashion, the user may press one of phone buttons 3-7 to select the corresponding non-featured search result element having title displayed to the right of the respective underlined number icon. In this manner, a user may save time by not having to navigate through various choices to get to a desired selection, and instead may select an appropriate element with a single input.

The search result elements may be displayed according to a relevancy metric. In an implementation, the data processing system 22 may rank the identified search result elements according to relevancy, and may present the most relevant result element first, the second most relevant result element second, etc. The ranking may be determined in any appropriate manner, as is known in the art, including by ranking results according to the number of matches with the submitted search query term (for example, the number of times the search query term appears on the web page corresponding to the search result element). In this manner, the user may be presented with the most relevant results first, which may reduce a user's evaluation and review time as the user may be more likely to find a desired selection earlier.

In an embodiment, a user may change the focus of the view 200 by supplying an input (for example, by pressing a directional button on the keypad) to the user interface module 40. In this example, the user might press a "down" directional button on the phone keypad to shift the focus from the first search result element 208 to the second search result element 221. The user interface module 40 may then accordingly present the second search result element 221 in expanded format such that its title, description, and address designator are displayed, while the first search result element 208 may be presented in a collapsed format, such that only its title 212 is displayed while its description 214 and address designator 216 are hidden from view. This may permit a user to cycle through the various search result elements and review detailed information pertaining to the focused search result element in expanded format, thereby permitting the user to make a more informed choice regarding element selection.

Off-page indicators 222, 224 may inform the user that additional information is available for presentation on the display, and may indicate a method of viewing the additional information. A "more results" icon 222 includes, to the left of the text, downward pointing arrows, which may indicate that additional search result elements are available for display, and that such elements will be presented if the user presses a "down" directional button, for example. Similarly, an "edit query terms" icon 224 includes upward pointing arrows, which may indicate that by pressing an "up" directional button, the user may gain access to a search box for editing the search or initiating a new search. Off-page indicators 222, 224 may cause user interface module 40 to perform the desired action following a single user action, regardless of where focus is currently maintained within the view. That is, the off-page indicators need not be first focused-on to be selected. They may be selected at any time simply by pressing the appropriate directional key, or some other appropriate key Referring now to FIG. 4, a view 250 that includes a search box 252, a search button 254, and selectable presentation format indicators 256 is shown. The search box 252 permits a user to enter one or more search query terms, for example, using the buttons of a telephone keypad in the conventional manner for entering text with a mobile phone. In an embodiment, the search box 252 may be focused-on by navigating (e.g., using directional keys) the focus box 218 (see FIG. 3) to the search box 252, and a search term may be entered. View 250 may be presented, in one example, following a user's selection of the "edit query terms" icon 224 in FIG. 3.

The search box 252 contains an entry ("mozart") corresponding to the previously entered search query term. The user may enter a new search term—for example, "Beethoven"—and may select the search button 254 to request a new network search, this time to search for network content pertaining to Ludwig van Beethoven. Data processing system 22 (see FIG. 1) may then conduct a network search, and the user interface module 40 may cause new search result elements associated with Beethoven to be presented on the display 14 of the mobile device 12. In other embodiments, a user may speak a search query term into a voice-recognition enabled device, text representing the spoken term may be presented in the search box 252, and the user may select the search button 254 or speak an appropriate audible command to request the search.

The selectable presentation format indicators 256 permit the user to select a desired presentation format for the search result elements, and may inform the data presentation system 22 of the type of search style to perform. In this example, a "Web" presentation format indicator 258 is selected, as indicated by the filled circle to the left of the text. This selection may cause the search result elements to be displayed in a textual format (such as a title, description, or address designator, for example), and may indicate that a selection of a result will cause the corresponding web page to be presented on the display.

An "Images" presentation format indicator 260, when selected, may cause images corresponding to the search result elements to be displayed. The images may be supplemented with textual matter (such as one or more of an address designator, title, or description, when the search result element is in expanded or collapsed mode). A "Local" presentation format indicator 262, when selected, may cause search results pertinent to a localized area to be presented. For example, search result elements corresponding to web pages for businesses located within an appropriate geographic region or within an appropriate distance from the location of the mobile device (determinable, e.g., via GPS positioning) may be presented. Other selectable presentation format indicators 256 may be used, including "Groups," "Blog," "News," "Froogle," etc., for network searches for newsgroup content, web log (blog) sites, news, and product and service pricing and information, respectively. Other possibilities include search results for video clips, audio clips, streaming files, television listings, telephone numbers, other contact information, and the like.

Figure 4:
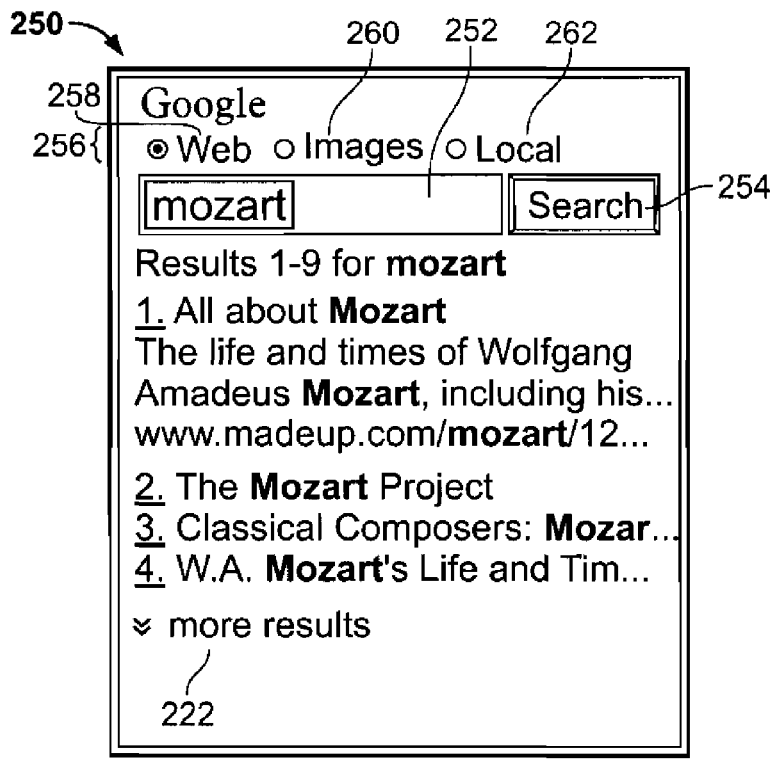

Referring again to view 200 in FIG. 3, which may be a first view presented on a mobile device following a receipt of a search request, view 200 may be considered "pre-scrolled," in the sense that the first view presented by the system may not include the top of the page (such as the search box 252, search button 254, and presentation format indicators 256, as seen in FIG. 4), but instead may be scrolled to a more relevant portion of the page, such as where the first search result elements begin. In one implementation, the user interface module transfers an entire page to a mobile device, where it is stored locally, and presents a portion of the page on the display, such as a most relevant portion (e.g., view 200, or view 320 shown in FIG. 7). A typical user may be interested in viewing the largest possible number of results after tendering a search request, and by pre-scrolling to the first search result element, a large number of elements may be presented in a first view. A user may view other portions of the page, for example, by selecting either the "edit query terms" or "more results" icon 224, 222.

Figure 5:
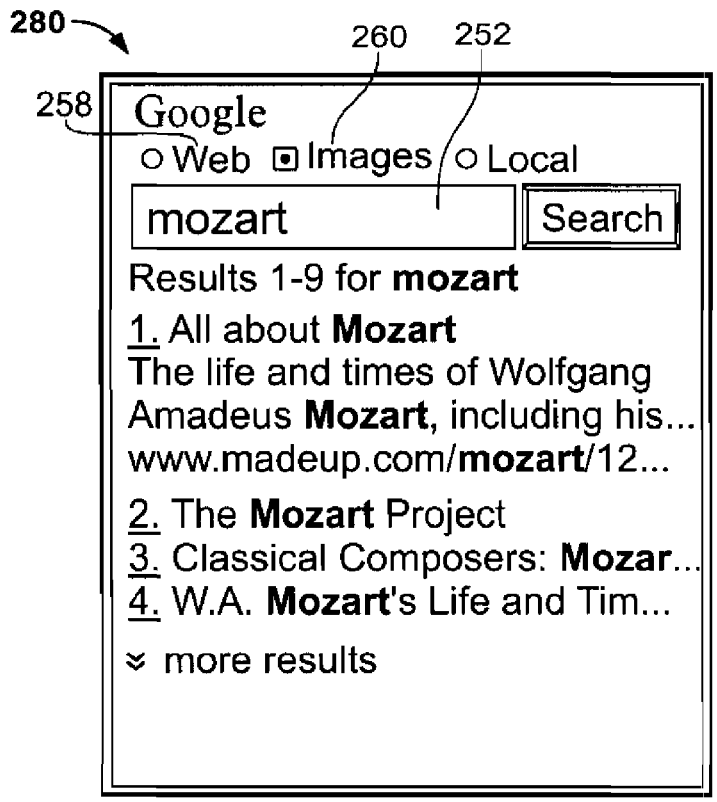

FIG. 5 shows a view 280 that may be presented when a user, working from view 250 in FIG. 4, navigates the focus box from the search box 252 to the "Images" presentation format indicator 260. In one implementation, a user may accomplish this by pressing the "up" directional button, which may cause the focus box to move to the "Web" indicator 258, and then by pressing the "right" directional button, which may cause the focus box to move to the "Images" indicator 260. Each new view may be controlled and rendered by the user interface module 40 (see FIG. 1), or may alternatively be controlled and rendered by the user interface 98 (see FIG. 2) on the handset. With the focus box on the "Images" indicator 260, as in view 280, the user may select the "Images" indicator 260 (for example, by pressing an "Okay" or "Select" button), and the presentation format for future searches may be changed from "Web" to "Images," in this example, as shown in FIG. 6.

Figure 6:
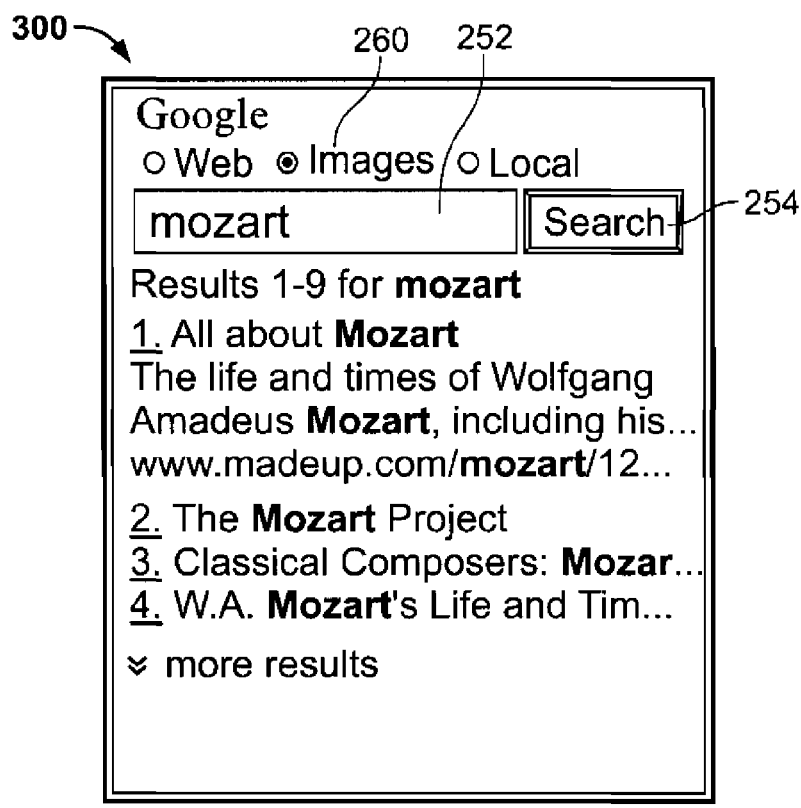

FIG. 6 shows a view 300 that includes a selected "Images" presentation format indicator 260 (as indicated by the filled circled to the left of the text), and a search button 254 enclosed by the focus box, indicating that focus has been brought to the search button 254. This may occur, for example, if the user uses directional control buttons to navigate the focus box from the "Images" presentation format indicator 260 as shown in view 280 (see FIG. 5) to the search button 254. Because the search box 252 still contains the search term "mozart," selection of the focused search button 254 may cause the data presentation system 22 (see FIG. 1) to search for network content including images pertaining to Mozart, and the user interface module 40 may present the search result elements in an images format, as will be described below with reference to FIGS. 7-9.

Figure 7:
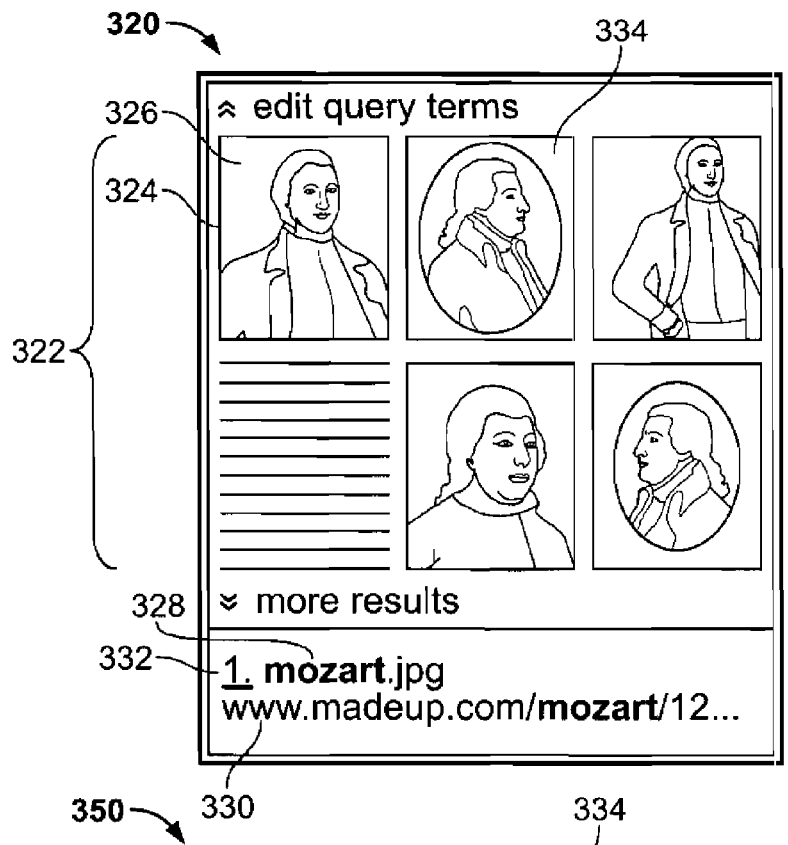

FIG. 7 shows a view 320 that includes a collection 322 of images, each representing a search result element and presented by the user interface module 40 (see FIG. 1) in response to a network search request initiated by a mobile device. In this example, the user interface module 40 may render view 320 in response to a network search request initiated by a user's selection of the search button 254 in view 300 (see FIG. 6), as described above. The images in the collection 322 of images may be displayed in a grid of one or more rows and one or more columns of images. In one implementation, the grid is tightly packed, with little or no separation between images and without interspersed text or other content, which may permit a large number of images to be concurrently displayed in the limited display screen area of a mobile device. Presenting multiple images concurrently in a single view may provide a better perspective for the user regarding the available content choices, and may permit a more reasoned and intelligent selection of a suitable search result element.

The collection 322 in view 320 includes six images, but more or fewer images may be displayed. In one implementation, nine images may be displayed in a grid, and each image may correspond to a search result element. Each of the images may be associated with an accelerator key (for example, with one of the phone number keys 1-9, respectively), thereby permitting single-action user selection.

In one embodiment, a watermark number (that is, an opaque number) corresponding to the associated accelerator key is superimposed over a portion of the respective image to inform a user of the corresponding accelerator key. In another embodiment, a solid (non-opaque) number is superimposed over a portion of the respective image, and in yet another embodiment, an image's position within the grid corresponds to, and is sufficiently descriptive of, the corresponding accelerator key, without the need to impose a number over a portion of the image (as in view 320). Where numbers are used, they may be placed in any convenient location, including adjacent or alongside the image. In similar fashion to the presentation of textual search result elements described with reference to FIGS. 3-6 above, the images in view 320 may be displayed according to a relevancy metric, with the image corresponding to the most relevant search result element displayed first, the image corresponding to the second most relevant search result element displayed second, and so on.

Each of the search result elements may be associated with an image, a label, and an address designator. Other descriptors such as a textual description, a title, a size metric, a display size indicator, a date, a content provider, etc., may also be associated with each search result element. A featured search result element 324 is presented in the view 320. The featured search result element 324 includes an image 326 of Mozart, located in an upper left position in the grid 322, and also includes a label 328 ("mozart.jpg") and an address designator 330 (a URL in this example). An accelerator key identifier 332, shown as an underlined "1" icon to the left of the label 328, identifies the corresponding accelerator key.

As such, the featured search result element is presented in an expanded format, as it includes not only an image 326, but also additional content—a label 328, an address designator 328, and an accelerator key identifier 332 in this example. The label 328, address designator 330, and accelerator key identifier 332 for the featured search result element 324 are located near the bottom of the view 320, beneath the grid 322 of images, which may permit a user to conveniently anchor their inspection near the bottom of the view 320, while still being able to easily view the grid 322 of images. This may permit a user to quickly and conveniently scan and compare the images in the grid 322, without the clutter or distraction of text or other content, and may provide an aesthetically pleasing display view.

In this illustrative example, a focus box surrounds the image 326 associated with the featured search result element 324. The remaining five images in the collection 322 of images correspond to non-featured search result elements. The non-featured search result elements are presented in a collapsed format, having only a single descriptor (an image) displayed, while other associated descriptors (such as a label, an address designator, and an accelerator key identifier) are hidden from view. In this manner, display screen area is conserved so that a larger number of non-featured search result elements may be concurrently presented, along with the featured search result element 324 and its expanded format content, which may provide the user with sufficiently detailed and abundant information to make an informed choice of whether to proceed with the featured search result element 324.

Figure 8:
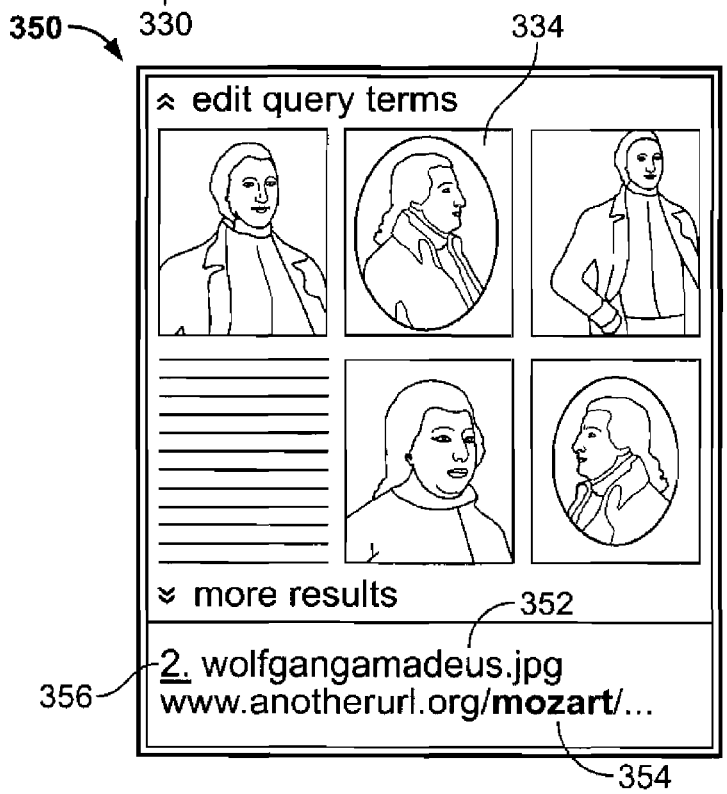

A user may change the focus of the current view 320, for example, by pressing directional buttons to navigate the focus box to a non-featured search result element. For example, the user may focus on a second image 334, corresponding to a second search result element, by pressing a "right" directional button, as will be discussed now with reference to FIG. 8. FIG. 8 shows a view 350 that presents the second search result element in an expanded format. As shown in view 350, the focus box encloses the second image 334, and a label 352 ("wolfgangamadeus.jpg"), address designator 354, and accelerator key identifier 356, each associated with the second search result element, are presented. As such, an image 334 and additional descriptors (a label 352, address designator 354, and accelerator key identifier 356) are displayed for the expanded format second search result element. The remaining search result elements in view 350, including the first search result element, are presented in a collapsed format, where a representative image is displayed but additional associated descriptors (such as a label, address designator, and accelerator key indicator) are hidden from view. The user may select the second search result element, in this example, either but pressing a select key (such as an "okay" key or a "select" key) or by pressing an accelerator key (such as the "2" key).

Figure 9:
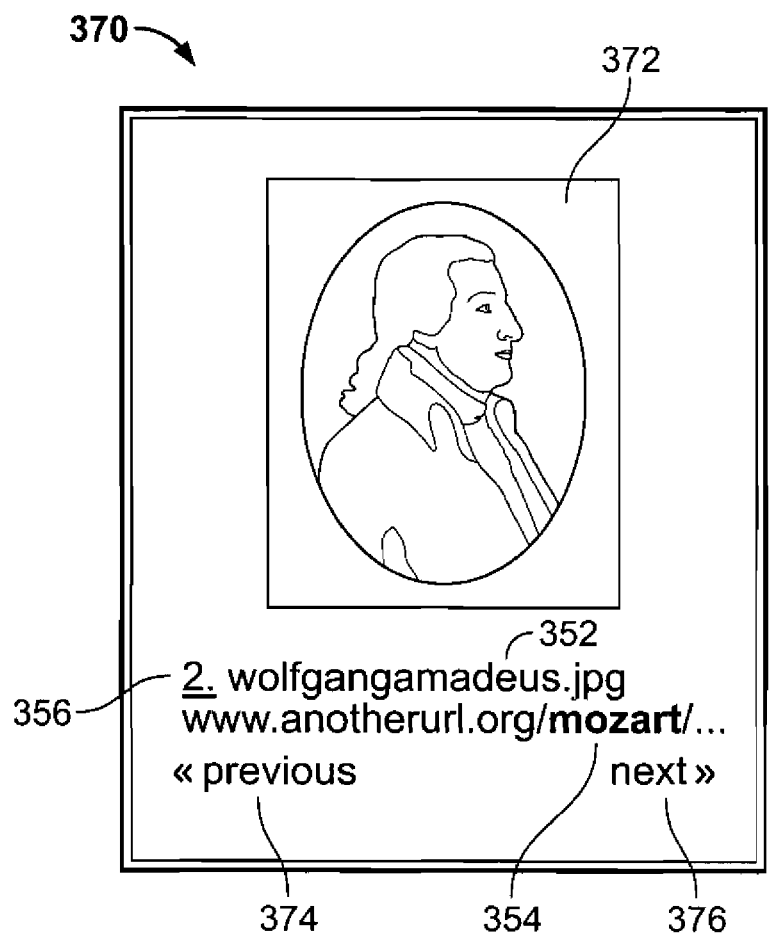

FIG. 9 presents a view 370 that may be presented by the user interface module 40 (see FIG. 1) when a user selects the focused (the second element in this example) search result element, as described above. View 370 presents an enlarged version 372 of the image 334 associated with the second search result element in view 320 (see FIG. 8), along with the associated label 352, address designator 354, and accelerator key identifier 356. A user may select a search result element to more closely inspect the search result element and its associated descriptors, or to request that additional content be retrieved or provided on the display. In one implementation, upon user selection of a search result element, the user interface module 40 causes electronic content (such as a web page or advertisement) to be presented on the display of the mobile device. The electronic content may include the image 334 associated with the search result element, textual content, video content, audio content, or any other electronic content associated with the respective search result element. The electronic content may have been previously stored in memory on the mobile device, in the data processing system 22, or on servers 24 (see FIG. 1).

The enlarged image 372 may be sized to fill a substantial portion of the display screen of the mobile device to better permit the user to more closely inspect the image 372. If additional descriptors such as a textual description, a title, a size metric, a display size indicator, a date, a content provider, an additional or alternative image, etc., are associated with the search result element, they may additionally or alternatively be displayed in view 370. "Previous" and "next" icons 374, 376 near the bottom of the view 370 may permit the user to view the previous or next search result, respectively, by pressing appropriate directional keys, such as a "left" directional key or a "right" directional key. Thus, a user may conveniently cycle through and sequentially review the various search result elements. In one implementation, the search result elements are presented according to a relevancy metric. The user may then sequentially view increasingly or decreasingly relevant search results, which may provide an efficient and time saving method of review.

Referring again to FIG. 4, a user may view additional search result elements in a text format by navigating to the "more results" icon 222 near the bottom of the view 250, or by pressing an associated accelerator key, if applicable. Additional search result elements may appear in a text format because the "Web" presentation format indicator 258 is selected in view 250.

Figure 10:
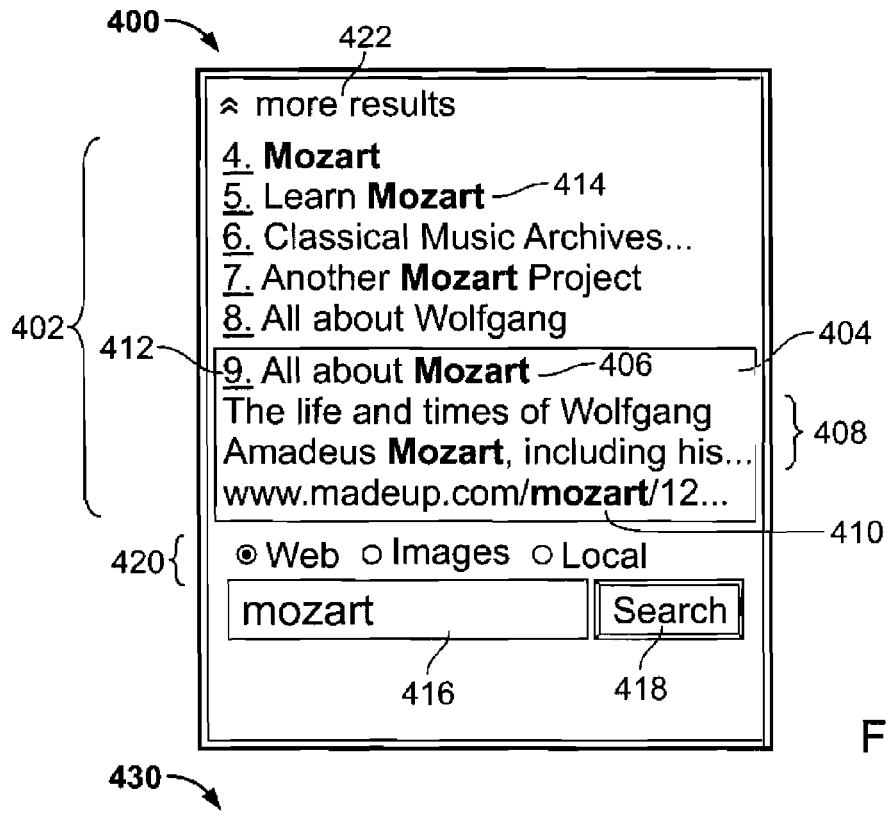
Figure 11:
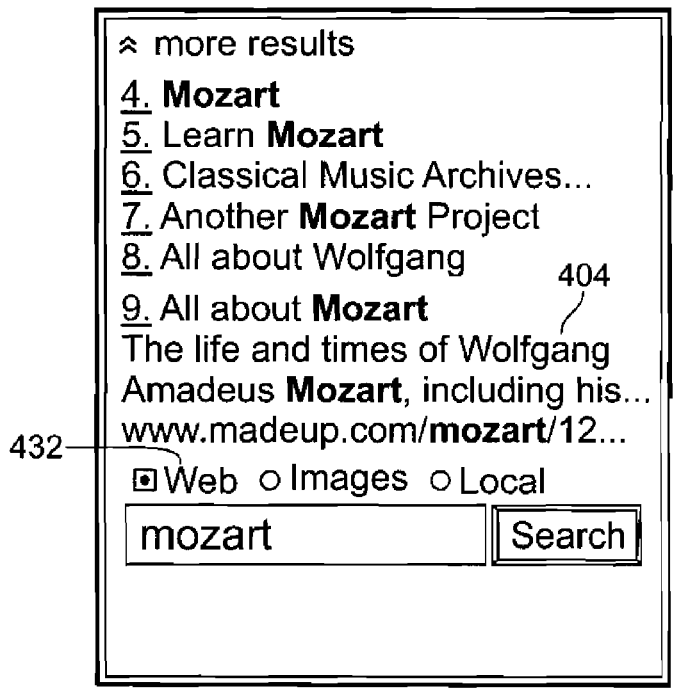
Figure 12:
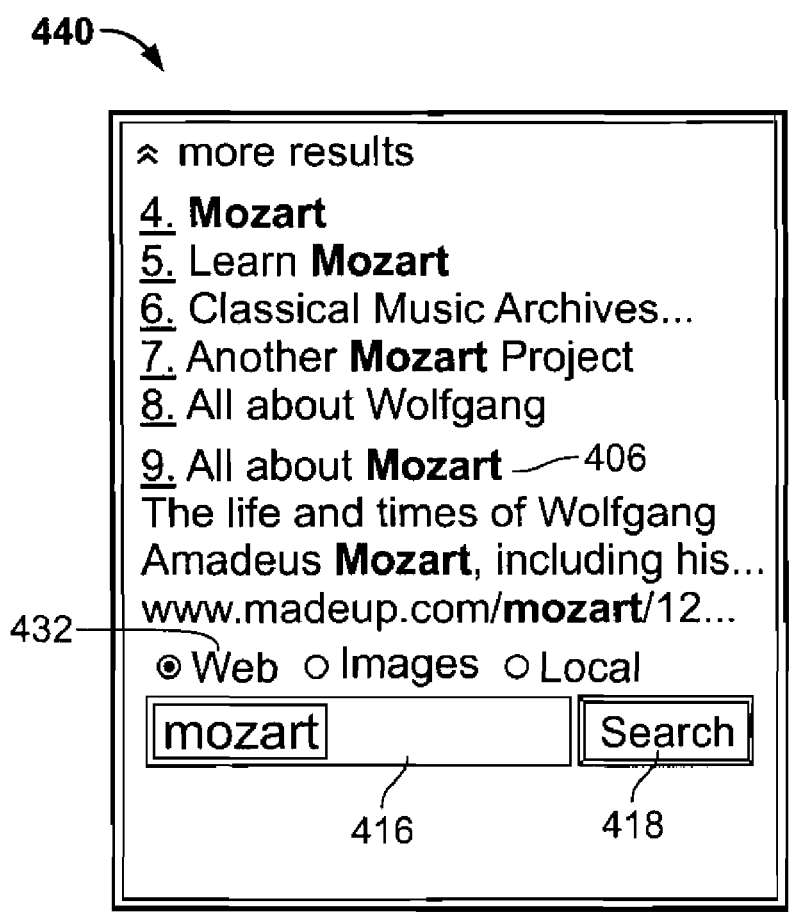

FIG. 10 shows a view 400 that includes a collection 402 of additional search result elements. In this example, the collection 402 of additional search result elements includes a featured search result element 404 and a group of non-featured search result elements. The featured search result element 404 is presented in an expanded format, including a title 406 ("All about Mozart"), a description 408, and an address designator 410. Here, the featured search result element 404 is the ninth search result element among the search result elements identified in response to the user's search request, as indicated by an underlined "9" accelerator key 412, positioned left of the title 406. The remaining search result elements in view 400, corresponding to the fourth through eighth search result elements, are presented in a collapsed format, where a single associated descriptor (a title in this example) for each is displayed, and additional associated descriptors (such as a description and an address designator) are hidden from view.

In one implementation, the user interface module 40 may cause view 400 to be displayed on the mobile device when the user selects the "more results" icon 222 in view 250 of FIG. 4. In another implementation, an alternative view that presents the fifth search result element 414 in an expanded format may be displayed, with the remaining search result elements displayed in a collapsed format. In this case, view 400 may then be realized by navigating the focus box from the fifth search result element 414 to the title 406 of the ninth search result element 404, e.g., by pressing a "down" directional button four times. In general, when a subsequent view containing additional search result elements is presented, or when a view containing previously-viewed search result elements is presented, any of the search result elements may be displayed in expanded format or collapsed format.

Like the search box 252, search button 254, and selectable presentation format indicators 256 shown in view 250 of FIG. 4, view 400 similarly includes a search box 416, a search button 418, and selectable presentation format indicators 420, this time near the bottom of the view 400. The search box 416, search button 418, and selectable presentation format indicators 420 may function as described above with reference to FIG. 4. As such, a user viewing a subsequent page of search result elements, such as view 400, may have access to these functions 416, 418, 420 without having to first return to a previous search result page, as by selecting a "more results" icon 422, which may cause the user interface module 40 to display a collection of previously viewed search results, such as those shown in view 250 of FIG. 4, and may similarly avoid having to further navigate up to the desired equivalent functions 252, 254, 256.

In one illustrative example, the user interface module 40 may first present a user with view 200 (see FIG. 3) or view 250 (see FIG. 4) in response to a tendered search request from a mobile device. The user may review the search result elements in this initial view, and may request to view additional search result elements in a manner as described above. The user interface module 40 may then accordingly present a subsequent view with additional search result elements, such as view 400. The user may review the additional search result elements, and may decide to initiate another network search. This may be conveniently accomplished by entering a new search term in search box 416 and selecting the search button 418.

To accomplish this, the user may alter the focus of the view, for example, by pressing a directional button, such as a "down" directional button on the mobile device. The user interface module 40 (see FIG. 1) may respond by presenting a view, such as view 430 shown in FIG. 11, where the focus box has moved from the ninth search result element 404 (see FIG. 10) to the "Web" presentation format indicator 432. The user may again alter the focus of the view by pressing the "down" directional button, and the user interface module 40 may present a view, such as view 440 of FIG. 12, where the focus box has moved from the "Web" presentation format indicator 432 (see FIG. 11) to the search box 416. The user may enter a new search term in the search box 416 in the conventional manner and select the search button 418 to tender a new network search request corresponding to the newly entered search term.

In response, the data processing system 22 may initiate a search in response to the newly tendered request, and user interface module 40 may present the results on the display of the mobile device. This may provide a more enjoyable user experience by reducing both the number of keystrokes and the time required to request network searches. In another example, the user may review the results as described above and may select an alternative presentation format from the presentation format indicators 420 (see FIG. 10), such as "Images" or "Local," which may cause the user interface module 40 to present the search result elements in the corresponding alternative format on the display.

Figure 13:
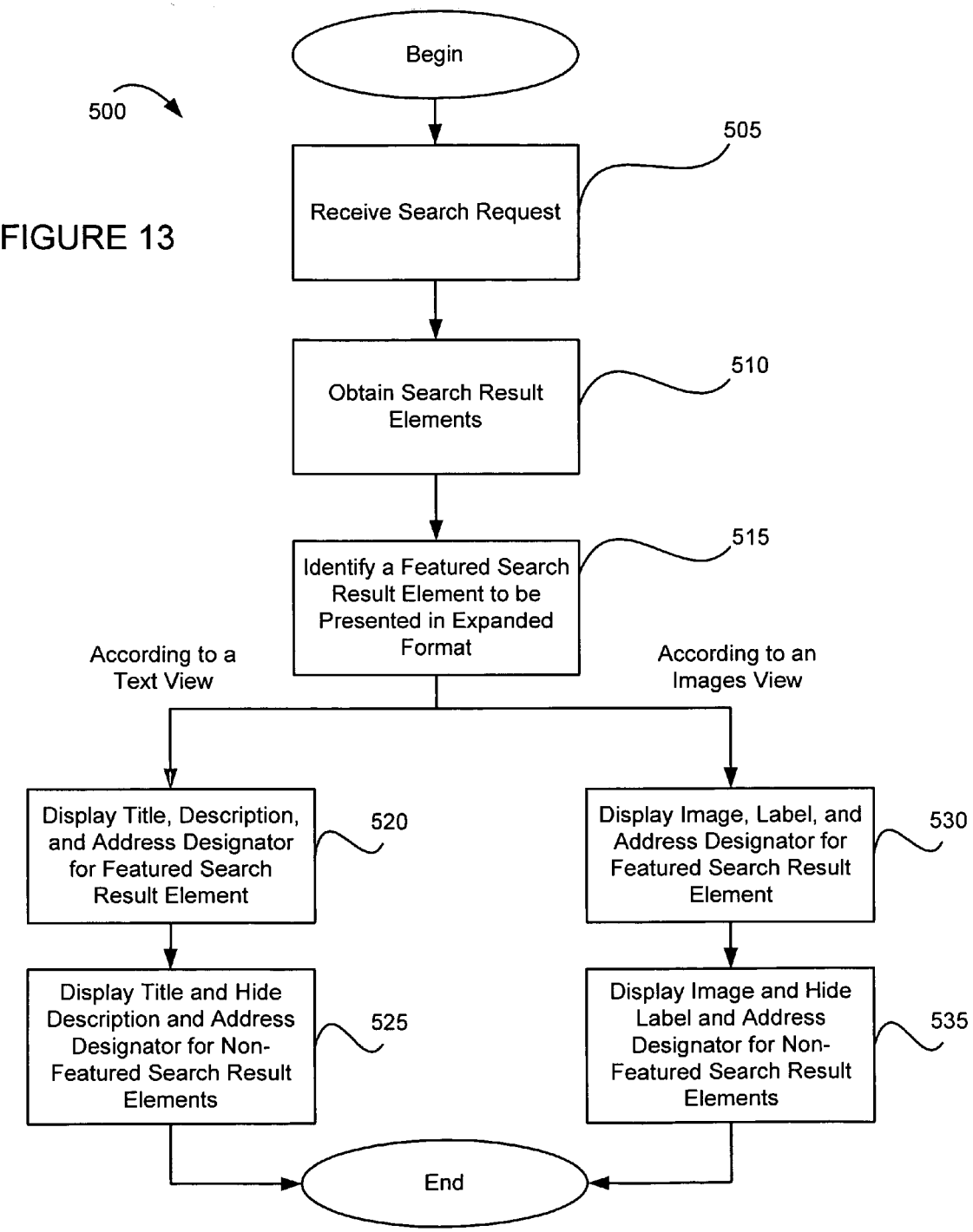
FIG. 13 is a flow chart showing exemplary steps for providing a first display view on a mobile device.

FIG. 13 is a flow chart 500 showing exemplary steps for providing a first display view on a mobile device. The steps shown may generally be executed by a user interface module, such as module 40, which may reside on a central server, such as data processing system 22, or on a mobile device. A process begins at step 505 with a receipt of a search request from a mobile device. The search request may include one or more search terms, as previously described. In response to the search request, search result elements are obtained at step 510. In one implementation, a search engine conducts a network search to locate appropriate search result elements, and presents the search result elements to the user interface module. Next, at step 515, a featured search result element is identified to be presented in an expanded format on the mobile device. This step 515 may include ranking the search result elements according to a relevancy metric, and identifying the most relevant search result element. Other identification strategies such as random identification, identification by alphabetizing, identification by most recently or least recently viewed element, identification based on the number of site "hits" associated with a given element, or any other suitable identification method.

Presentation of search result elements may depend upon whether the elements are to be presented in a "text view," or in another type of view, such as an "images," "local," "news," "blog," "groups," "Froogle," etc. If the elements are to be presented in a text view, a title, description and address designator may be displayed for the featured search result element at step 520. Of course, more or fewer descriptors may be displayed. Additionally, a title may be displayed for an appropriate number of non-featured search result elements at step 525, and the corresponding descriptions and address designators may be hidden from view to conserve display screen area, which may permit more elements to be displayed. The user interface module 40 may consider device limitations when creating the view, such as available display screen area, resolution limitations, graphics capability of the device, connection speed, processor speed, and the like.

If, rather than according to a text view, the elements are to be presented in an images view, an image, label, and address designator may be displayed for the featured search result element at step 530. Of course, more or fewer descriptors may be displayed. Additionally, an image may be displayed for an appropriate number of non-featured search result elements at step 535, and the corresponding labels and address designators may be hidden from view to conserve display screen area, which may permit more elements to be displayed concurrently. The images may be presented in a grid of one or more rows and one or more columns of images, and the images may be closely spaced. In one implementation, nine images may be presented in a grid of three rows and three columns.

Figure 14:
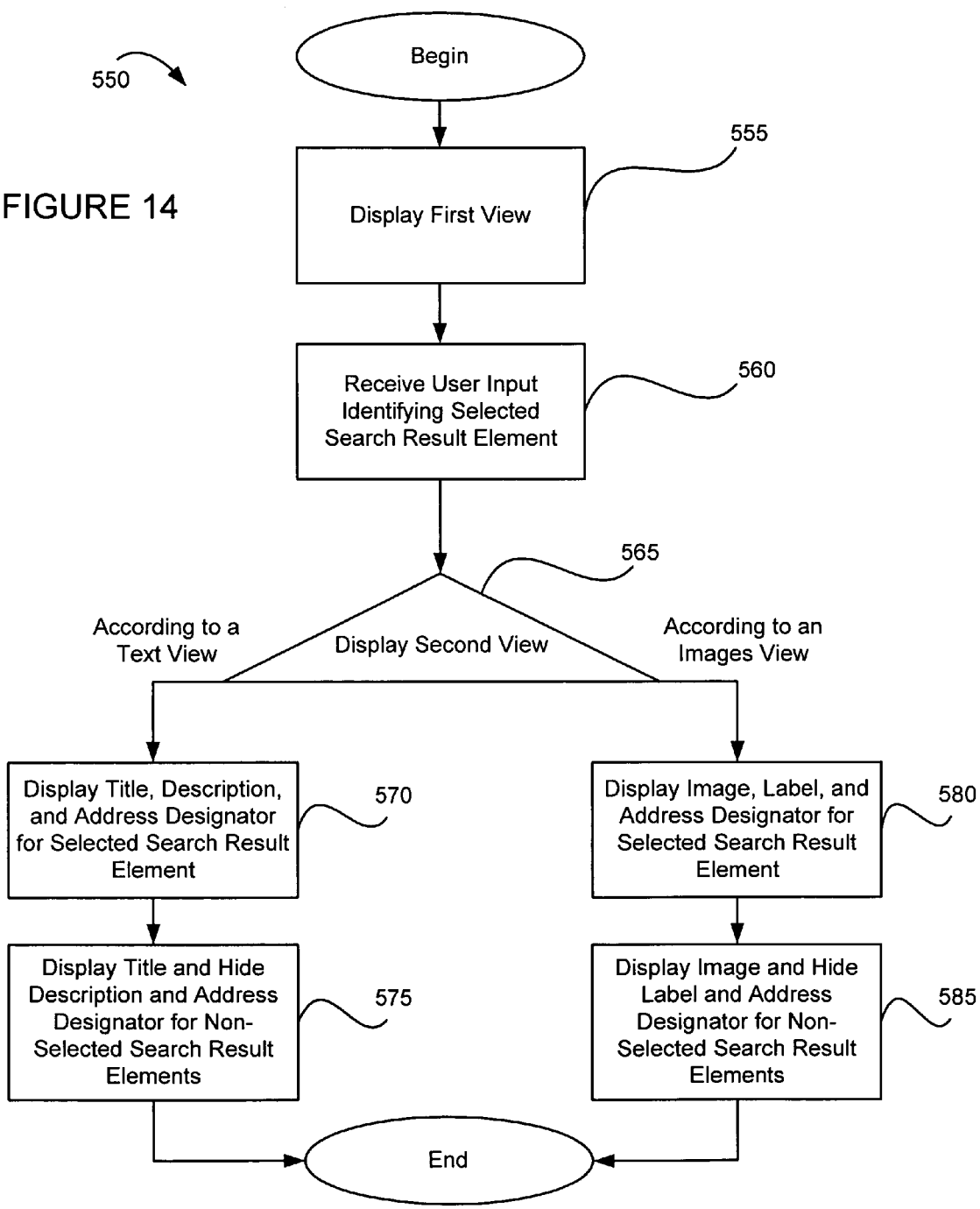
FIG. 14 is a flow chart showing exemplary steps for responding to an input and presenting a second display view on a mobile device.

FIG. 14 is a flow chart 550 showing exemplary steps for responding to an input and presenting a second display view on a mobile device. The steps shown may generally be executed by a user interface module, which may reside on a central server or on a mobile device. A first view may be displayed on a screen of a mobile device at step 555, for example, according to the steps of the flow chart 500 shown in FIG. 13. In an embodiment, the first view may include a collection of search result elements. At step 560, a user input is received that identifies a selected search result element. A determination must be made at step 565 (shown as a triangle) concerning the appropriate view presentation format. If the elements are to be displayed in a text mode, for example, if a "Web," "News," "Groups," etc. presentation format indicator is selected, a title, description, and address designator may be displayed for the selected search result element at step 570. A title may be displayed for all non-selected search result elements, including a search result element that had previously been displayed in an expanded format, at step 575. The corresponding descriptions and address designators may be hidden for the non-selected search result elements.

If, rather than according to a text view, the elements are to be presented in an "images" view, for example, if an "Images" presentation format indicator is selected, an image, label, and address designator may be displayed for the featured search result element at step 580. Additionally, an image may be displayed for an appropriate number of non-featured search result elements at step 585, and the corresponding labels and address designators may be hidden from view to conserve display screen area, which may permit more elements to be displayed concurrently.

Figure 15:
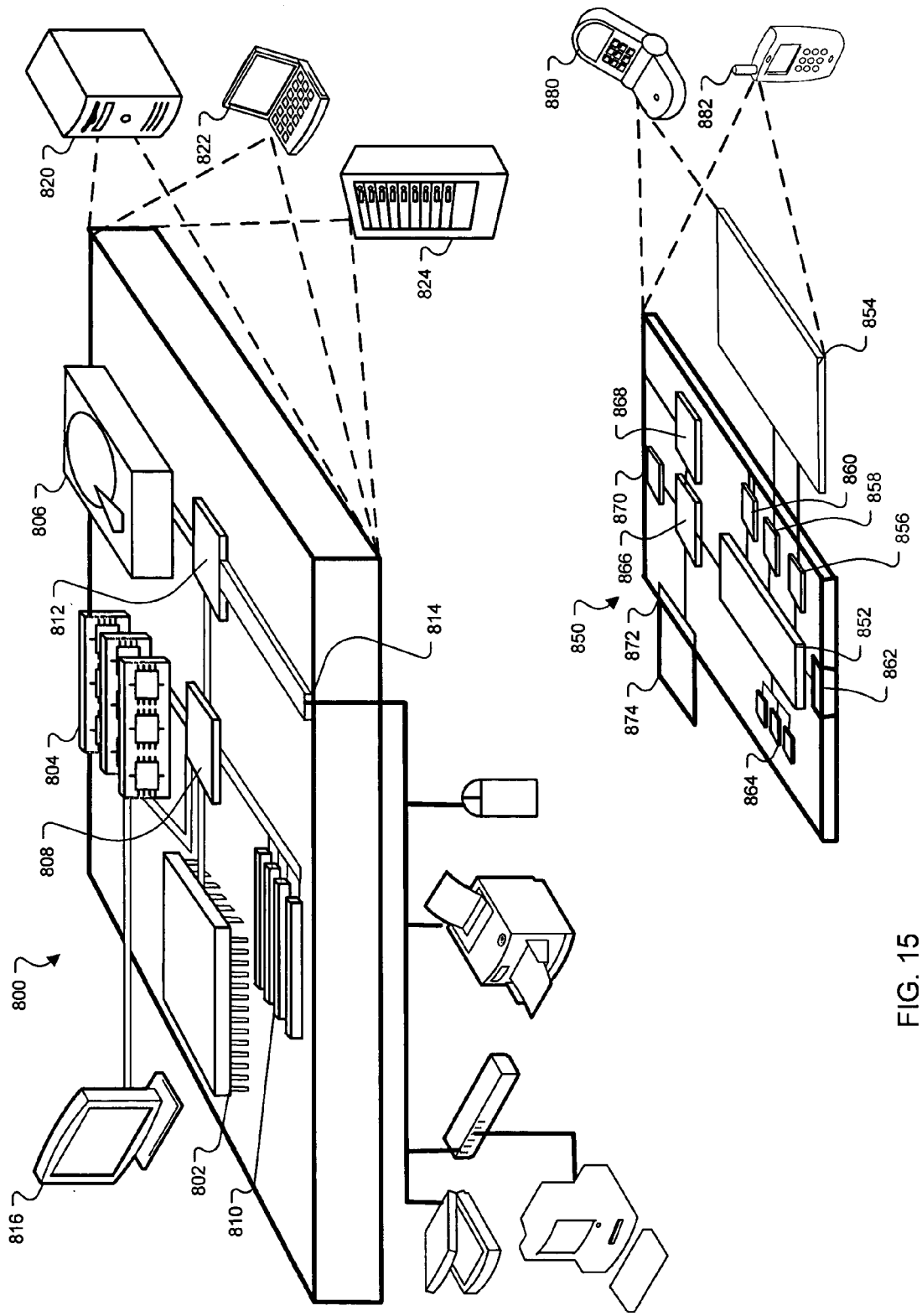
FIG. 15 is a block diagram of computing devices that may be used to implement the systems and methods described in this document, as either a client or as a server or plurality of servers.

FIG. 15 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In-Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications and methods have been described, it should be recognized that numerous other applications are contemplated. Accordingly, other embodiments are within the scope of the following claims.

What is claimed is:

1. A computer-implemented method of displaying information on a mobile computing device, the method comprising:

presenting, on a display screen of a mobile computing device, a list of search results that are vertically arranged so that each of the search results is above or below another search result, with (a) a first search result in the list in an expanded format in which the first search result displays a title that is descriptive of a corresponding first landing page and content extracted from a sub-portion of the first landing page, in distinction to a display of all content from the first landing page, and (b) remaining search results in the list in a collapsed format in which each remaining search result displays a title that is descriptive of a corresponding landing page, but each remaining search result does not display content extracted from a sub-portion of the corresponding landing page;

receiving a user input indicating an intent to move a focus from the first search result to a second search result in the list of vertically arranged search results; and in response to receiving the user input, displaying the first search result in the collapsed format, and displaying the second search result in the expanded format, wherein user selection of one of the search results in the list causes the mobile computing device to navigate to a landing page that corresponds to the selected result;

wherein the presenting the list of search results includes presenting, in a first view of a search results page provided on the display screen in response to the user submitting a search query, a portion of the search results page that is pre-scrolled to the list of search results so that a search button on the search results page for initiating a search is not presented for initial display.

2. The computer-implemented method of claim 1, wherein the receiving the user input includes receiving an indication that a user of the mobile computing device pressed a directional button on a keypad of the mobile computing device.

3. The computer-implemented method of claim 1,
wherein the user selection of the one search result, when the one search result is displayed in the expanded format, causes the device to navigate to the landing page for the one search result; and
further comprising receiving a different form of user input, when the one search result is displayed in the collapsed format, that causes the device to navigate to the landing page corresponding to the search result without providing a display of the search result in the expanded format.

4. The computer-implemented method of claim 3, wherein the different form of user input is a user selection of a button on the mobile computing device, wherein the button and the search result each include a display of a same indicia, and wherein each search result is associated with a display of a different indicia.

5. The computer-implemented method of claim 4, wherein the indicia is a number.

6. The computer-implemented method of claim 1, wherein the content extracted from a sub-portion of the first landing page is displayed vertically above or below other of the search results.

7. The computer-implemented method of claim 1, wherein the content extracted from a sub-portion of the first landing page is not displayed horizontally to the side of other of the search results.

8. The computer-implemented method of claim 1, wherein the presenting, receiving, and displaying is performed by a server system or a mobile computing device.

9. A computer-readable medium having instructions stored thereon that, when executed, perform a method comprising:

presenting, on a display screen of a mobile computing device, a list of search results that are vertically arranged so that each of the search results is above or below another search result, with (a) a first search result in the list in an expanded format in which the first search result displays a title that is descriptive of a corresponding first landing page and content extracted from a sub-portion of the first landing page, in distinction to a display of all content from the first landing page, and (b) remaining search results in the list in a collapsed format in which each remaining search result displays a title that is descriptive of a corresponding landing page, but each remaining search result does not display content extracted from a sub-portion of the corresponding landing page;

receiving a user input indicating an intent to move a focus from the first search result to a second search result in the list of vertically arranged search results; and in response to receiving the user input, displaying the first search result in the collapsed format, and displaying the second search result in the expanded format, wherein user selection of one of the search results in the list causes the mobile computing device to navigate to a landing page that corresponds to the selected result;

wherein the presenting the list of search results includes presenting, in a first view of a search results page provided on the display screen in response to the user submitting a search query, a portion of the search results page that is pre-scrolled to the list of search results so that a search button on the search results page for initiating a search is not presented for initial display.

10. The computer-readable medium of claim 9, wherein the receiving the user input includes receiving an indication that a user of the mobile computing device pressed a directional button on a keypad of the mobile computing device.

11. The computer-readable medium of claim 9,
wherein the user selection of the one search result, when the one search result is displayed in the expanded format, causes the device to navigate to the landing page for the one search result; and
further comprising receiving a different form of user input, when the one search result is displayed in the collapsed format, that causes the device to navigate to the landing page corresponding to the search result without providing a display of the search result in the expanded format.

12. The computer-readable medium of claim 11, wherein the different form of user input is a user selection of a button on the mobile computing device, wherein the button and the search result each include a display of a same indicia, and wherein each search result is associated with a display of a different indicia.

13. The computer-readable medium of claim 12, wherein the indicia is a number.

14. The computer-readable medium of claim 9, wherein the content extracted from a sub-portion of the first landing page is displayed vertically above or below other of the search results.

15. The computer-readable medium of claim 9, wherein the content extracted from a sub-portion of the first landing page is not displayed horizontally to the side of other of the search results.

16. The computer-readable medium of claim 9, wherein the presenting, receiving, and displaying is performed by a server system or a mobile computing device.

17. A system comprising:
a mobile computing device to (i) receive a search query from a user of the mobile computing device, (ii) present on a display screen of the mobile computing device a list of search results that are vertically arranged so that each of the search results is above or below another search result, with (a) a first search result in the list in an expanded format in which the first search result displays a title that is descriptive of a corresponding first landing page and content extracted from a sub-portion of the first landing page, in distinction to a display of all from the landing page, and (b) remaining search results in the list in a collapsed format in which each remaining search result displays a title that is descriptive of a corresponding landing page, but each remaining search result does not display content extracted from a sub-portion of the corresponding landing page; and (iii) receive user input indicating an intent to move a focus from the first search result to a second search result in the list of vertically arranged search results; and
means for displaying the first search result in the collapsed format, and displaying the second search result in the expanded format in response to receiving the user input indicating the intent to move the focus from the first search result to the second search result;
wherein the presenting the list of search results includes presenting, in a first view of a search results page provided on the display screen in response to the user submitting a search query, a portion of the search results page that is pre-scrolled to the list of search results so that a search button on the search results page for initiating a search is not presented for initial display.

* * * * *